Sept. 22, 1970    J. R. WOODWARD ET AL    3,529,693
ACOUSTICAL SANDWICH PANEL HAVING HONEYCOMB CORE WITH
CRUSHED INTERMEDIATE ZONE AND METHOD OF MAKING SAME
Filed Nov. 3, 1969
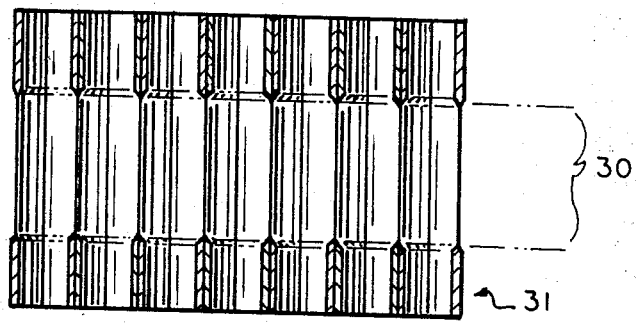
FIG. 4
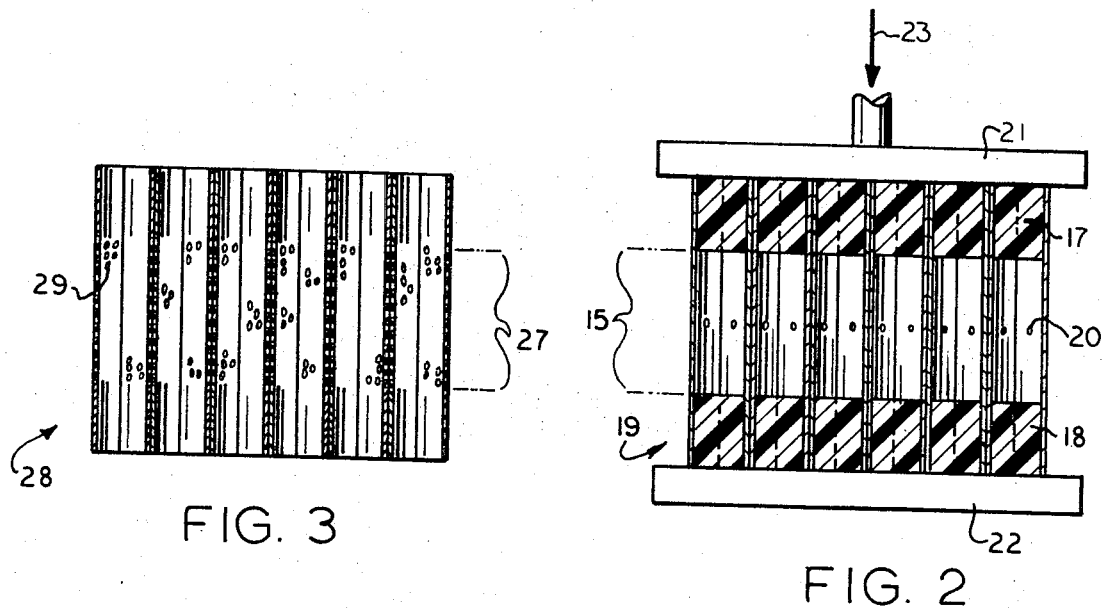
FIG. 3
FIG. 2
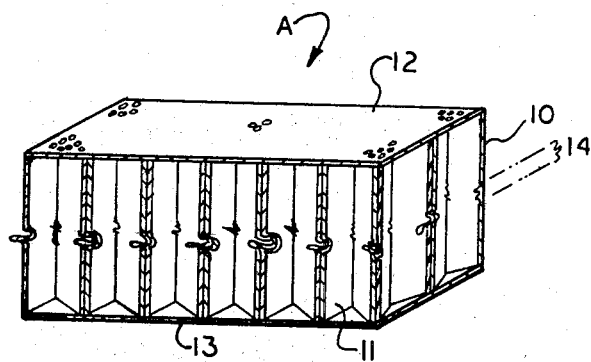
FIG. 1
INVENTORS
JAMES R. WOODWARD
BILLY G. COOK
WALLIE P. GRAY
BY EDWIN C. KAMPS
ATTORNEY United States Patent Office 3,529,693
Patented Sept. 22, 1970

3,529,693
ACOUSTICAL SANDWICH PANEL HAVING HONEYCOMB CORE WITH CRUSHED INTERMEDIATE ZONE AND METHOD OF MAKING SAME
James R. Woodward, El Cajon, Calif., Billy G. Cook, Booneville, Ark., and Wallie P. Gray, Chula Vista, and Edwin C. Kamps, San Diego, Calif., assignors to Rohr Corporation, Chula Vista, Calif., a corporation of Delaware
Filed Nov. 3, 1969, Ser. No. 873,203
Int. Cl. B29d 27/00; B32b 3/12; E04b 1/86
U.S. Cl. 181—33                              9 Claims

ABSTRACT OF THE DISCLOSURE

Honeycomb core for use in making honeycomb sandwich panels has a selected zone of its cell wall structure intermediately of the ends thereof collapsed or crushed to form a sound obstructive barrier within the core, the localized crushing being accomplished either by weakening the cell walls of the core within the zone to be crushed, or by supporting the cell walls endwise beyond said zone, and then subjecting the core to a limited, endwise crushing force. By filling the portions of the cells beyond said zone within a solid substance the folds of the cell walls formed by the crushing can be flattened.

BACKGROUND OF THE INVENTION

In making sound suppressive honeycomb sandwich panels which are exposed to the sound of jet engines and other noise producing mechanisms it is common practice to provide a honeycomb sandwich structure wherein a central backing layer of thin sheet material, such as aluminum or stainless steel, is mounted between two layers of honeycomb core material, and a facing of thin, perforated, sound previous sheet material is applied to the outer end of each layer of the core material. The assembly thus formed is then unified by suitable means such as an adhesive or by brazing.

The same general practice is followed in making a single core type panel wherein one surface only of the panel is to be used for sound absorption. In that case an imperforate backing layer is applied to one end of a layer of honeycomb core material, and a thin, perforated, sound pervious facing is applied to the other end of the core material. With either the double core or single core panels, the core material acts as a resonant chamber to change the wave length of some of the sound waves entering therein, and to transform some of the sonic energy to heat, which is transferred via conduction and radiation into the ambient atmosphere.

Co-inventor Woodward has made extended studies of crushed honeycomb core material, and such studies indicate, among other things, that (1) crushed core has greater stiffness than the same core in uncrushed condition; (2) crushing eliminates the need for surfacing; (3) precision fits are obtainable by simple coining operations; and (4) costs are reduced. Page 104, Woodward, Master's Thesis, Crushed-Core Sandwich, San Diego State College, July 1964.

SUMMARY OF THE INVENTION

It is a primary objective of the present invention to provide a sound obstructive zone within honeycomb core material by crushing the cell walls of the core material within such zone, while maintaining subtantially intact the portions of the cell walls beyond such zone. By filling the portions of the cells beyond such zone with a suitable solid, the crushed portions of the cells can also be flattened along a plane within such zone.

BRIEF DESCRIPTION OF THE DRAWINGS

The foregoing objectives and advantages of the invention will be apparent from the following description and the accompanying drawings, wherein:

FIG. 1 is a perspective view of a fragment of honeycomb sandwich panel embodying the invention.

FIG. 2 is an enlarged, side elevational view of a fragment of honeycomb core material prepared for crushing the cell walls within an intermediate zone thereof.

FIG. 3 is a sectional view showing a fragment of core material with the cell walls of an intermediate zone thereof weakened by perforations.

FIG. 4 is a sectional view similar to FIG. 3 showing a fragment of core material with the cell walls of an intermediate zone thereof weakened by chem-milling.

DETAILED DESECRIPTION

Referring to the drawings in detail, a honeycomb sandwich panel A embodying the invention, see FIG. 1, comprises a single honeycomb core 10 having a usual multiplicity of endwise directed cells 11 therein, and with thin, perforated facing sheets 12 and 13 of suitable material, such as aluminum or stainless steel, applied to opposite ends thereof. The composite parts of the panel A are integrally united in a well known manner as by brazing, or by the use of a suitable adhesive such as an epoxy cement.

Intermediate portions of the walls defining the cells 11 within a selected zone 14 of the honeycomb core 10 are collapsed or crushed endwise. The collapsed cell wall portions within the zone 14 extend into, and at least partially obstruct the core cells 11, and thus prevent the honeycomb core 10 from providing a clear, resonant chamber throughout its entire depth for sound waves entering the core via either of the facings 12 or 13. Due to this obtructive zone 14, which in FIG. 1 is located along the plane substantially medially of the depth of the core, the single honeycomb core 10 has, at least in substantial part, a sonic effect similar to that produced by a well known duoble core sandwich structure comprising a usual central backing layer (not shown) of sheet material with a layer of honeycomb core material on each side thereof, and sound pervious facing sheets applied to the outer faces of the assembly thus provided.

Although not shown in the drawings, it will be obvious to anyone familiar with the design and manufacture of honeycomb panels that the crushed zone of the core is not necessarily located medially of the depth of the core, but could be located at one or both ends of the core if desired. If located at an end of a core the crushed zone may be used in place of a facing sheet on said end of the core.

In order to crush only the portions of the cell walls of a core within a selected zone intermediately of the ends of the core, such as the zone 14 shown in FIG. 1, or the zone 15 shown in FIG. 2, the end portions of the core cells 11 endwise beyond the zone 14 may be filled with a solid, cell wall supporting substance as shown at 17 and 18 in FIG. 2, while the portions of the cells within the zone 15 selected for crushing are left unfilled. This partial filling of the cells can be accomplished in several different ways which will readily occur to any ordinarily skilled worker.

For example, one of the core 19, see FIG. 2, may be dipped to a desired depth as at 17 into a liquid or molten, hardenable substance, such as a freezable liquid, a low melting point metal or suitable thermoplastic material, and the liquid or molten material allowed to solidify or harden therein. The core 19 may then be inverted and the other ends of the cells filled, as at 18, to a required depth in a similar manner, leaving the cells empty within the zone 15 selected for crushing. It will of course be necessary to vent the cells for filling the second ends of the cells when that is desired, and this may be accomplished by providing vent holes 20 in the cell walls within the zone 15. A suitable thermoplastic such as shown in FIG. 2 may be a wax, such as that disclosed in patent application Ser. No. 741,287, filed July 1, 1968 and assigned to the assignee of the present application, while a suitable low melting point metal may be a bismuth alloy such as Cerro de Pasco Cerrolow 117 or 136, etc.

After the core cells have thus been filled except within the zone 15 selected for crushing, and cell filling material is in its hardened condition, the core 19 may be placed between the platen 21 and bed 22 of a suitable press as shown in FIG. 2 and subjected to an endwise compressive force as indicated by the arrow 23 to crush or collapse the unsupported portions of the cell walls within the selected, unfilled zone 15 to substantially the configuration shown within the zone 14 in FIG. 1. The cell filling materials 17 and 18, besides supporting the portions of the cell walls endwise beyond the zone 15, have the desirable additional effect of flattening or compressing between them the folded or crushed portions of the cell walls which extend into the cells along a plane within the zone 15 of the honeycomb core 19.

In the event that compression or flattening of the folds of the crushed cell wall portions is not essential or desirable, the crushing of the cell walls within a selected zone of a core can be accomplished by making the portions of the cell walls to be crushed less resistive to an endwise crushing force than the portions of the cell walls endwise beyond such zone. For example, a zone 27 of a core 28, see FIG. 3, selected for crushing can be weakened by pre-perforating the cell walls with a multiplicity of perforations 29 throughout said zone. The perforation-weakened cell walls of the core 28 may then be crushed within the selected zone 27 as by means of a press as shown in FIG. 2, or by rolling.

The portions of the cell walls within a selected zone of a honeycomb core also may be weakened as shown in FIG. 4, by first chem-milling the cell walls within the zone 30 selected for crushing, thereby to attenuate the cell walls within said zone, and then applying an endwise crushing force to the honeycomb core 31 as described previously herein.

Localized crushing of the cell walls within a selected zone of a honeycomb core may be facilitated by leaving unadhered throughout said zone the nodes of the usual corrugated ribbons which form the cell walls.

Regardless of the means and method used for crushing the cell walls throughout a selected intermediate zone of a honeycomb core, it is preferred to thereafter apply brazing compound to the crushed area, and to braze this area, preferably at the same time that any end facings employed are brazed to the core.

The invention provides a unitary honeycomb core having at least a partial sonic barrier within a selected intermediate zone of the core. The degree of opening in the crushed zone of the individual cells is controlled at least in part by the length of the zone which is subjected to the crushing operation, and whether or not the crushed wall portions are compressed or flattened as described previously herein.

The invention provides a simple, relatively inexpensive and fast means for making a honeycomb core panel, and provides a new and useful article of manufacture. It eliminates the step of fitting the core to one, or in some cases two sheets to the ends of the core, and the adhering or brazing of such sheet or sheets to the core.

Having illustrated and described our invention, we now claim and desire to protect by Letters Patent of the United States of America:

1. An acoustical honeycomb sandwich panel comprising:
   a honeycomb core having a multiplicity of cells with walls of thin, sheet material disposed transversely of the panel,
   a facing of thin sheet material covering at least one face of the core and having a multiplicity of small perforations therein communicating the atmosphere exteriorly of the panel with the core cells,
   the portions of the cell walls within a selected zone intermediate the faces of the cores being deformed by crushing to extend into, and partially to obstruct, the cells of said core, and
   the remaining portions of the cell walls being substantially intact.

2. An article of manufacture as claimed in claim 1 wherein portions of the crushed cell walls which extend into the cells are flattened along a plane in said selected zone substantially parallel to an end of the core.

3. An article of manufacture as claimed in claim 1 wherein the portions of the cell walls deformed by crushing are thinner than said remaining cell wall portions.

4. An article of manufacture as claimed in claim 1 wherein the portions of the cell walls deformed by crushing are of the same material and thickness as said remaining cell wall portions.

5. An article of manufacture as claimed in claim 1 wherein the portions of the cell walls deformed by crushing are weakened by a multiplicity of perforations therein, and said remaining cell wall portions are in normal, unweakened condition.

6. An article of manufacture as claimed in claim 1 wherein the portions of the cell walls deformed by crushing are of material which is less resistant to crushing than the material of the said remaining cell wall portions.

7. The method of making an acoustical honeycomb sandwich which comprises
   treating a honeycomb core structure with walls of thin sheet material disposed transversely of the panel so that the portions of the cell walls within a selected zone of the core structure intermediate the faces of the core are relatively less able to resist a crushing force directed endwise of the cells than the portions of the cell walls beyond said zone,
   subjecting said core structure to a crushing force directed endwise of the cells sufficient to crush the cell wall portions within said selected zone, said crushing force being restrained short of crushing the cell walls endwise beyond said zone, and
   applying a facing of thin sheet material having a multiplicity of small perforations to at least one face of the core and spaced from the crushed zone of the core with the perforations communicating the atmosphere exteriorly of the panel with the core cells.

8. The method defined in claim 7 wherein only the portions of the cell walls endwise beyond said selected zone are filled with a substance for supporting the walls of said cell portions prior to subjecting said core structure to said crushing force, and said substance is removed from said cell portions after subjecting the core to said crushing force.

9. The method defined in claim 8 wherein said substance is a hard substance and the application of the crushing force is continued to a point where crushed portions of the cell walls are subjected to a flattening force by said hard substance.

References Cited

UNITED STATES PATENTS

| | | |
|---|---|---|
| 1,925,453 | 9/1933 | Mazer. |
| 2,720,948 | 10/1955 | Pajak _____ 161—68 XR |
| 2,728,479 | 12/1955 | Wheeler. |
| 2,860,740 | 11/1958 | Holland et al. ____ 161—68 XR |
| 3,368,314 | 2/1968 | Maynard _____ 52—451 |
| 3,386,877 | 6/1968 | Skochdopole et al. |

ROBERT S. WARD, Jr., Primary Examiner

U.S. Cl. X.R.

161—68; 264—320